US012196150B2

(12) United States Patent
Mori

(10) Patent No.: US 12,196,150 B2
(45) Date of Patent: Jan. 14, 2025

(54) INJECTION CONTROL DEVICE

(71) Applicant: DENSO CORPORATION, Kariya (JP)

(72) Inventor: Daiki Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/360,399

(22) Filed: Jul. 27, 2023

(65) Prior Publication Data

US 2024/0044303 A1 Feb. 8, 2024

(30) Foreign Application Priority Data

Aug. 5, 2022 (JP) ................................ 2022-125584

(51) Int. Cl.

*F02D 41/20* (2006.01)
*F02D 41/00* (2006.01)
*F02D 41/40* (2006.01)

(52) U.S. Cl.

CPC ......... *F02D 41/402* (2013.01); *F02D 41/008* (2013.01)

(58) Field of Classification Search

CPC .... F02D 41/00; F02D 41/008; F02D 41/0087; F02D 41/0085; F02D 41/0082; F02D 41/30; F02D 2001/007; F02D 2041/2051; F02D 2041/202; F02D 41/20; F02D 41/401; F02D 41/40; F02D 41/402; F02D 41/406; F02M 51/00; F02M 65/00

USPC ................ 123/478, 350, 480, 490, 472, 445

See application file for complete search history.

(56) References Cited

U.S. PATENT DOCUMENTS

| | | | | |
|---|---|---|---|---|
| 10,450,995 B2 * | 10/2019 | Kimura | F02D 41/40 |
| 2016/0108847 A1 * | 4/2016 | Nakano | F02D 41/20 123/490 |
| 2018/0195450 A1 | 7/2018 | Mukaihara et al. | |
| 2018/0283306 A1 | 10/2018 | Kusakabe et al. | |
| 2019/0085783 A1 | 3/2019 | Kusakabe et al. | |
| 2022/0018301 A1 * | 1/2022 | Kato | F02D 41/26 |
| 2022/0403795 A1 | 12/2022 | Yanoto et al. | |

FOREIGN PATENT DOCUMENTS

| | | | | |
|---|---|---|---|---|
| CN | 104110320 A * | 10/2014 | F02D 41/20 |
| DE | 102015224819 A1 * | 6/2016 | F02D 41/20 |
| EP | 2365201 A2 * | 9/2011 | F02D 41/20 |
| JP | 2011-052631 A | 3/2011 | |
| JP | 2016-113955 A | 6/2016 | |
| JP | 2018094951 A * | 6/2018 | |

OTHER PUBLICATIONS

DE-102015224819-A1—English Translation (Year: 2016).*
U.S. Appl. No. 18/360,493, filed Jul. 27, 2023, Suganuma.

* cited by examiner

*Primary Examiner* — George C Jin
*Assistant Examiner* — Teuta B Holbrook
(74) *Attorney, Agent, or Firm* — Posz Law Group, PLC

(57) ABSTRACT

An injection control device includes an injection controller that is configured to control a fuel injection valve, which is current-driven by a charging voltage obtained by boosting a battery voltage, to perform fuel injection a plurality of times for each cylinder. The injection controller is configured to prohibit learning or adjust an injection when the charging voltage does not reach a predetermined determination voltage.

8 Claims, 6 Drawing Sheets

INJECTION CONTROL DEVICE

CROSS REFERENCE TO RELATED APPLICATION

The present application claims the benefit of priority from Japanese Patent Application No. 2022-125584 filed on Aug. 5, 2022. The entire disclosures of all of the above applications are incorporated herein by reference.

TECHNICAL FIELD

The present disclosure relates to an injection control device that controls a fuel injection valve.

BACKGROUND

In the related art, multi-stage injection in which fuel injection is performed multiple times for each cylinder is utilized.

SUMMARY

According to an aspect of the present disclosure, an injection control device comprises an injection controller configured to control a fuel injection valve, which is current-driven by a charging voltage obtained by boosting a battery voltage, to perform fuel injection a plurality of times for each cylinder.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, examples of the present disclosure will be described.

In order to reduce harmful components contained in exhaust gas, there is a multi-stage injection in which fuel injection is performed multiple times for each cylinder. At this time, in order to exert an effect of reducing the harmful components at a maximum limit, it is necessary to perform each injection in the multi-stage injection with high accuracy. In order to perform the injection with high accuracy, for example, it is necessary to learn a state of a fuel injection valve or to charge the fuel injection valve to a high voltage required for the injection.

However, depending on a situation such as an operating environment, aging, or a traveling state of a vehicle, it is assumed that the fuel injection valve cannot be charged to the high voltage required for the injection. When the fuel injection valve is not charged to the required high voltage, appropriate learning may not be performed, a required injection amount cannot be secured, and controllability may be deteriorated.

According to an example of the preset disclosure, an injection control device includes an injection controller configured to control a fuel injection valve, which is current-driven by a charging voltage obtained by boosting a battery voltage, to perform fuel injection a plurality of times for each cylinder. The injection controller is configured to prohibit learning or adjust an injection when the charging voltage does not reach a predetermined determination voltage.

Figure 1:
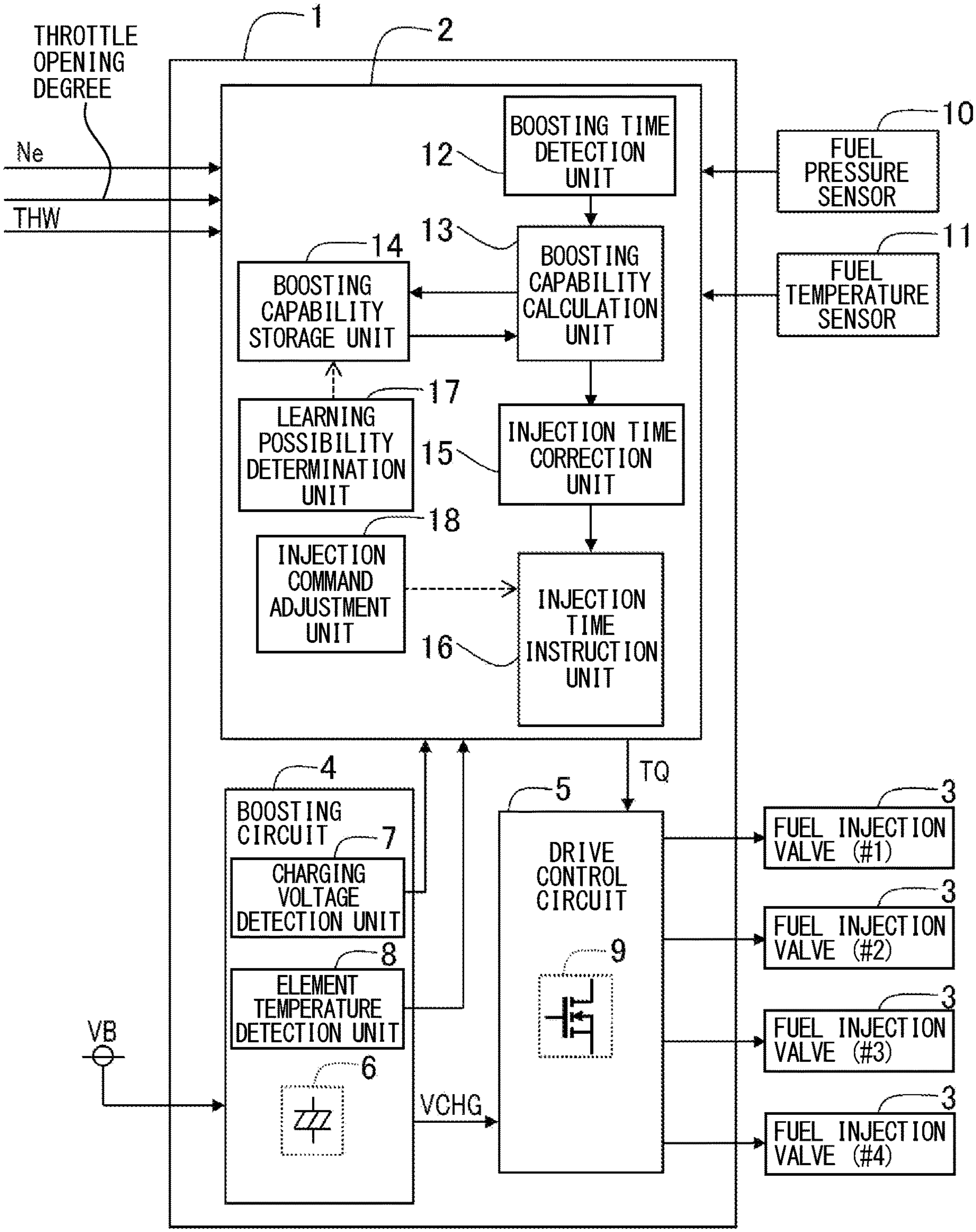
FIG. 1 is a diagram showing an example of an injection control device according to an embodiment.

Hereinafter, embodiments will be described with reference to the drawings. As shown in FIG. 1, an injection control device 1 according to the present embodiment is implemented as an electronic control device including a microcomputer 2 including a CPU (not shown), various memories, and the like. The injection control device 1 controls fuel injection valves 3 provided in cylinders of an internal combustion engine. In FIG. 1, the fuel injection valves 3 provided in a four-cylinder internal combustion engine are shown, and #1 refers to a first cylinder, #2 refers to a second cylinder, #3 refers to a third cylinder, and #4 refers to a fourth cylinder. As is well known, each of the fuel injection valves 3 includes members such as a coil and a spring, and electric characteristics and mechanical characteristics of the members are involved in a state and behavior of the fuel injection valve 3, such as a valve opening operation and a valve closing operation.

The injection control device 1 includes, in addition to the microcomputer 2, a boosting circuit 4 and a drive control circuit 5. The boosting circuit 4 includes a capacitor 6, boosts a battery voltage (VB) by charging the capacitor 6, and supplies the battery voltage (VB) as a charging voltage (VCHG) to the drive control circuit 5. The boosting circuit 4 is provided with a charging voltage detection unit 7 and an element temperature detection unit 8. The charging voltage detection unit 7 detects the charging voltage boosted by the boosting circuit 4 and outputs the detected charging voltage to the microcomputer 2. The element temperature detection unit 8 detects a temperature of an element such as the capacitor 6 or an inductor (not shown) that constitute the boosting circuit 4 and outputs the detected temperature to the microcomputer 2.

The drive control circuit 5 includes a switching circuit including a transistor 9, and opens and closes a supply path of a charging voltage to the fuel injection valve 3 based on an injection command (TQ) which is a command value output from the microcomputer 2.

Figure 2:
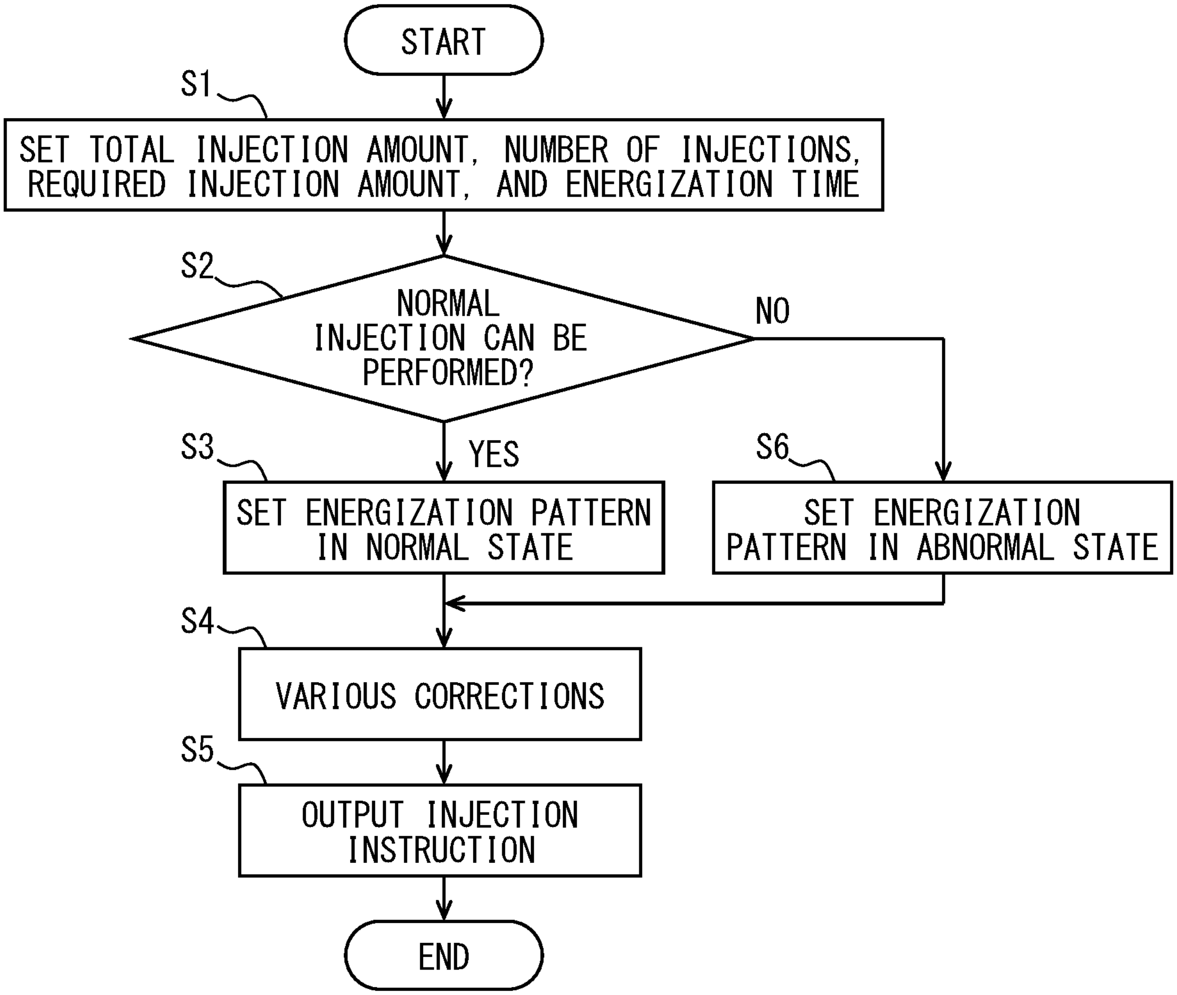
FIG. 2 is a flowchart showing a fuel injection main routine.

As shown in FIG. 2 which schematically shows a flow of injection control, the microcomputer 2 generates and outputs an injection command by performing an injection for each cylinder, and controls fuel injection from the fuel injection valve 3. The microcomputer 2 corresponds to an injection control unit (injection controller) that controls the fuel injection valve 3, which is current-driven by a charging voltage obtained by boosting a battery voltage, to perform fuel injection multiple times in one cycle for each cylinder.

In step S1, the microcomputer 2 calculates a total injection amount of fuel injected from the fuel injection valve 3 of a target cylinder, the number of injections, an individual required injection amount for each injection, and an energization time. For example, the microcomputer 2 generates an injection command based on various parameters and outputs the injection command to the drive control circuit 5. The parameters include a crank signal (Ne) corresponding to a rotational speed, a throttle opening degree signal corresponding to an opening degree of a throttle valve detected by a throttle opening degree sensor, vehicle information such as a water temperature (THW), a fuel pressure detected by a fuel pressure sensor 10 provided in a fuel supply system for supplying fuel to the fuel injection valve 3, a fuel temperature detected by a fuel temperature sensor 11, and the like. However, the parameters illustrated here are examples.

Subsequently, in step S2, the microcomputer 2 determines whether a normal injection can be performed. In the present embodiment, the microcomputer 2 determines that the normal injection can be performed when the fuel pressure detected by the fuel pressure sensor 10 is lower than a predetermined pressure threshold and when a past injection including a previous injection has been normally performed. The pressure threshold is set in advance as a determination value for determining that the fuel pressure is excessively high.

On the other hand, the microcomputer 2 determines that the normal injection cannot be performed when the fuel pressure detected by the fuel pressure sensor 10 is higher than the pressure threshold or when the past injection has not been normally performed. At this time, the microcomputer 2 determines that the past injection has not been normally performed, for example, when at least one situation continues for a predetermined time among a situation where a change in the rotation speed in a combustion stroke is equal to or less than a predetermined value, a situation where a fuel pressure decrease amount caused by the injection is equal to or less than a predetermined value, a situation where a valve closing timing after the end of energization at the time of the injection is earlier than a predetermined timing, and a situation where a cranking time at the start of the internal combustion engine is equal to or larger than a predetermined value.

When determining that the normal injection can be performed, the microcomputer 2 sets an energization pattern in a normal state in step S3 since YES is determined in step S2. In the energization pattern in the normal state, a value of the charging voltage applied to the fuel injection valve 3, and a peak value and a hold value of a drive current capable of achieving the charging voltage are set. The energization pattern is appropriately set to a value that enables the normal injection while considering variations in the fuel injection valve 3 and the drive control circuit 5 and the like.

On the other hand, when determining that the normal injection cannot be performed, the microcomputer 2 sets an energization pattern in an abnormal state in step S6 since NO is determined in step S2. For example, when the fuel pressure is equal to or larger than the pressure threshold, a force for pressing the fuel injection valve 3 toward a valve closing side may become excessively large, and the injection may be abnormal. Therefore, the microcomputer 2 sets an energization pattern in which, for example, after the energization starts, the drive current rises to a peak current, and then the charging voltage is multiply and repeatedly applied. The energization pattern in the abnormal state can be variably set according to the fuel pressure, for example.

When the energization pattern is set, the microcomputer 2 performs various corrections in step S4. In step S4, for example, a process of correcting a valve opening energy input when the fuel injection valve 3 is opened following the energization start of the fuel injection valve 3, a process of correcting a valve closing timing based on a behavior of the fuel injection valve 3 when the fuel injection valve 3 is closed, a static correction process of correcting a variation in a mechanical characteristic of the fuel injection valve 3, a battery voltage correction process of correcting a variation in an injection amount in accordance with the decrease in the battery voltage are performed. However, the correction content shown here is an example.

Figure 3:
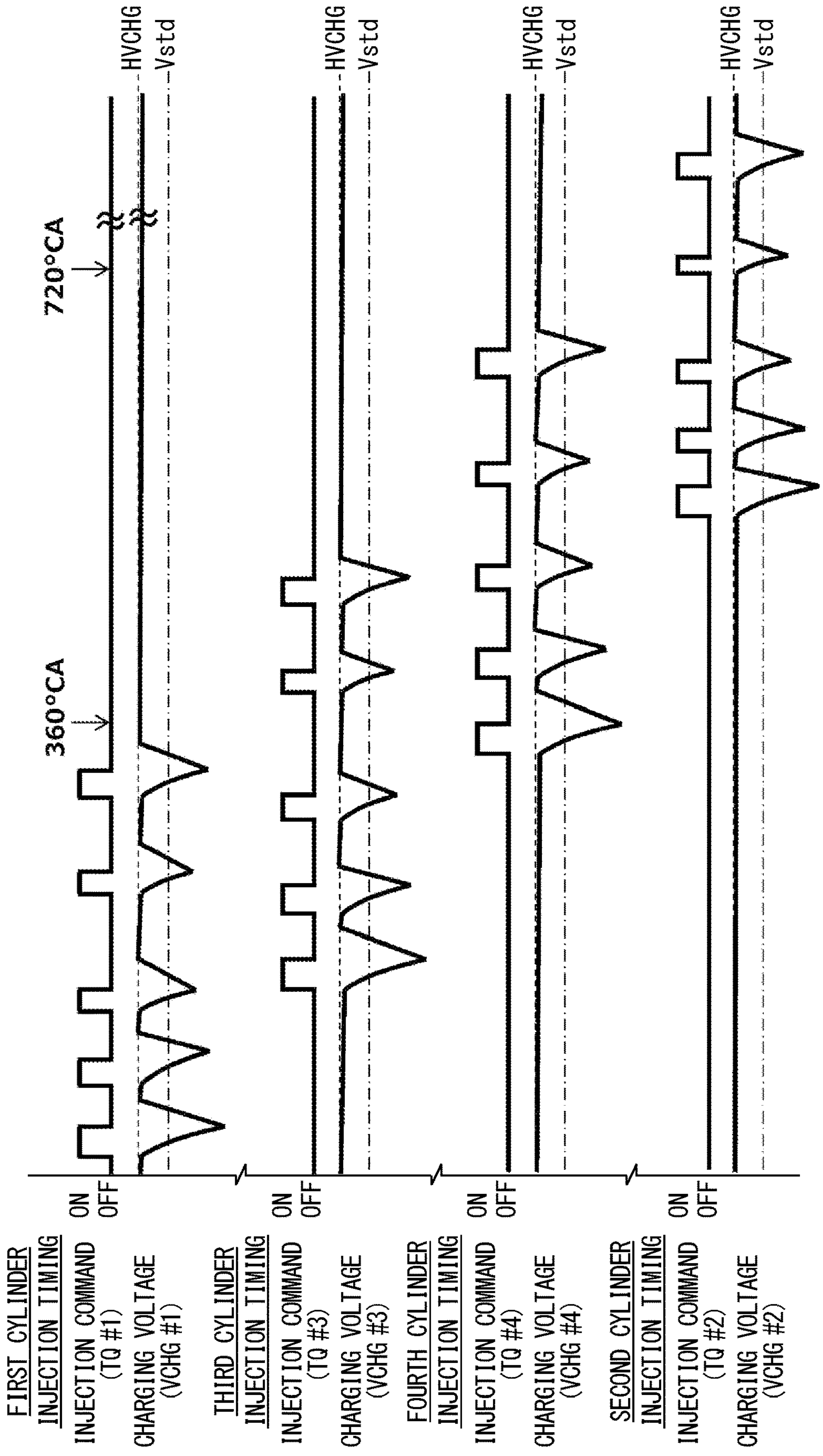
FIG. 3 is a diagram showing an example of injection timings of cylinders.

Subsequently, in step S5, the microcomputer 2 outputs an energization instruction as an energization command signal to the drive control circuit 5 based on the injection amount and the energization time that are obtained by appropriately performing the above-described various corrections and the like. The drive control circuit 5 supplies a drive signal to the fuel injection valve 3. For example, as shown in FIG. 3, the injection is controlled in the order of the first cylinder, the third cylinder, the fourth cylinder, and the second cylinder, and the fuel injection is performed five times during an intake stroke, a compression stroke, a combustion stroke, and an exhaust stroke in each cylinder.

When an injection instruction is issued, the injection command is on, and the fuel injection valve 3 is applied with a charging voltage from the drive control circuit 5 to start the fuel injection. When the injection instruction is canceled, the injection command is off, the application of the charging voltage is stopped, and the fuel injection valve 3 stops the fuel injection. As will be described in detail later, HVCHG and Vstd are voltage values set as determination voltages, HVCHG corresponds to a target voltage, and Vstd corresponds to a standard voltage. "° CA" means a crank angle.

The injection control device 1 according to the present embodiment performs learning relating to the fuel injection, which is an example. Therefore, in order to learn a boosting capability and reflect a learning result, the microcomputer 2 is provided with a boosting time detection unit 12, a boosting capability calculation unit 13, a boosting capability storage unit 14, an injection time correction unit 15, and an injection time instruction unit 16. These units are function units implemented by software by executing programs on the microcomputer 2. However, a learning target of the injection control device 1 is not limited to the boosting capability, and other items such as the state of the fuel injection valve 3 can be the learning target.

The boosting capability is generally learned as follows. The boosting time detection unit 12 detects a boosting time required for the charging voltage to reach the target voltage based on a detection result of the charging voltage detection unit 7, and outputs the detected boosting time to the boosting capability calculation unit 13. The boosting capability calculation unit 13 calculates a boosting capability indicating an amount of energy stored in the capacitor 6 per unit time using the boosting time, and outputs the boosting capability to the boosting capability storage unit 14 and the injection time correction unit 15.

The boosting capability storage unit 14 stores the input boosting capability, thereby enabling correction of an injection set time in a period in which the boosting capability calculation unit 13 cannot calculate the boosting capability, for example. That is, the boosting capability storage unit 14 learns the boosting capability when the fuel injection is performed. A period in which a boosting capability a cannot be calculated is a period in which at least one of cases where the capacitor 6 is discharged and the charging voltage exceeds over the battery voltage is established. The period can be set as a period other than a period from the power-on of the injection control device 1 to the start of the fuel injection by the fuel injection valve 3.

The injection time correction unit 15 compares the calculated boosting capability with a predetermined reference boosting capability, sets an injection correction time, and outputs the injection correction time to the injection time instruction unit 16. For example, when the boosting capability is higher than the reference boosting capability, the charging voltage is larger than that in the case of the reference boosting capability. In this case, a time until the drive current for driving the fuel injection valve 3 reaches a valve opening threshold current required for valve opening is shortened.

Therefore, the injection time correction unit 15 calculates an injection correction time such that the injection set time is shortened so that the injection amount is the same as that in the case of the reference boosting capability. On the other hand, when the boosting capability is lower than the reference boosting capability, the time until the drive current reaches the valve opening threshold current becomes longer, and thus the injection time correction unit 15 calculates an injection correction time such that the injection set time becomes longer so that the injection amount is the same as that in the case of the reference boosting capability.

The injection time instruction unit 16 generates an injection command for each cylinder based on various parameters described above. At this time, the injection time instruction unit 16 corrects the injection time calculated based on the various parameters with the injection correction time calculated by the injection time correction unit 15 to generate an injection command, and outputs the injection command to the drive control circuit 5. The drive control circuit 5 drives the fuel injection valve 3 by switching the transistor 9 based on the injection command.

The microcomputer 2 is provided with a learning possibility determination unit 17 and an injection command adjustment unit 18. These units are function units implemented by software by executing programs on the microcomputer 2.

Although details will be described later, the learning possibility determination unit 17 determines a possibility of the learning performed in the injection control device 1 based on the charging voltage. In the present embodiment, the possibility of the learning is determined based on whether storage of the boosting capability is permitted or prohibited. However, the learning possibility determination unit 17 may be configured to determine a possibility of learning not only for learning of the boosting capability but also for other items such as the state of the fuel injection valve 3.

Although details will be described later, the injection command adjustment unit 18 adjusts the injection command generated by the injection time instruction unit 16 for each injection of each cylinder. In the present embodiment, the injection command adjustment unit 18 adjusts the injection command by delaying a timing at the time of issuing an injection instruction, extending the injection time, and limiting the number of injections. Whether to adjust the injection command is determined based on the charging voltage.

Next, an operation of the above-described configuration will be described.

As described above, in order to exert an effect of reducing harmful components contained in exhaust gas at a maximum limit, it is necessary to perform each injection in multi-stage injection with high accuracy. In this case, it is necessary to learn the state of the fuel injection valve 3 or to charge the fuel injection valve 3 to a high voltage required for the injection. However, depending on a situation such as an operating environment, aging, or a traveling state of a vehicle, it is assumed that the fuel injection valve 3 cannot be charged to the high voltage required for the injection.

When the fuel injection valve 3 is not charged to the high voltage required for the injection, appropriate learning may not be performed. When the correction is performed based on an inappropriate learning result, the fuel injection cannot be appropriately performed. When the fuel injection valve is not charged to the required high voltage, a required injection amount cannot be secured, and controllability may be deteriorated. Therefore, the injection control device 1 can perform appropriate learning and reduce deterioration of controllability.

Figure 4:
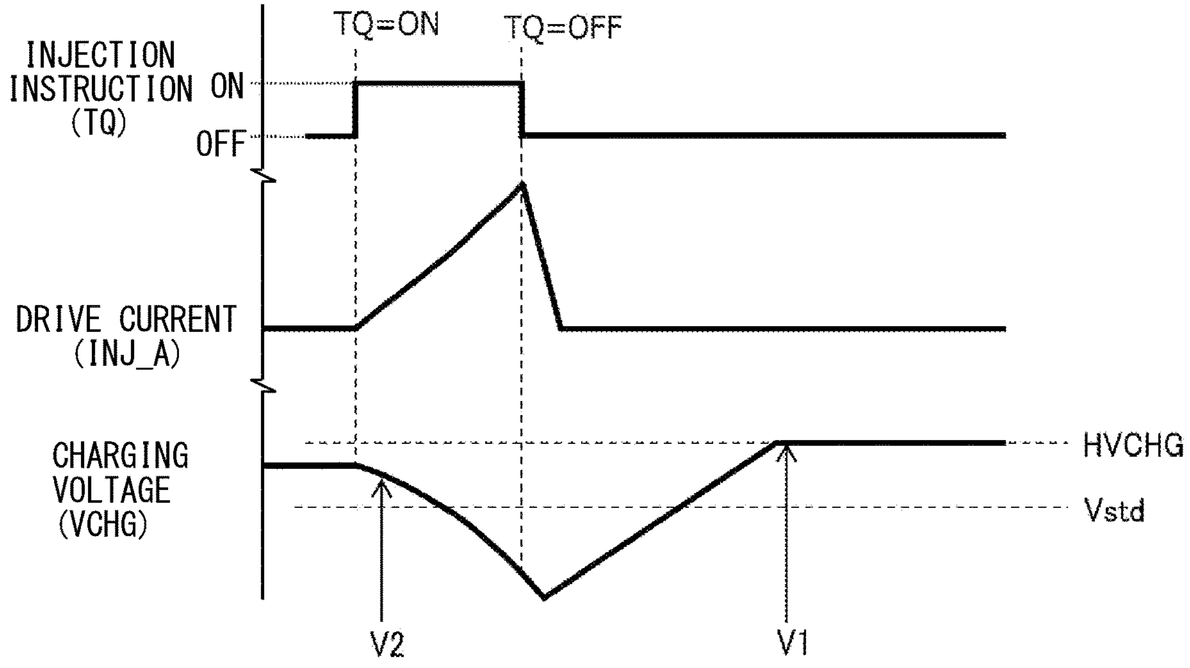
FIG. 4 is a diagram showing an example of a relation between an injection command, a drive current, and a charging voltage during an injection.

First, definitions of terms will be described. As schematically shown in FIG. 4, the injection command (TQ) is a signal that is switched between on and off. Hereinafter, a timing when the injection command is switched from off to on is referred to as TQ=ON, and a timing when the injection command is switched from on to off is referred to as TQ=OFF. At this time, a drive current (INJ_A) of the fuel injection valve 3 increases when the injection command is on, and the fuel injection valve 3 performs a valve opening operation to start fuel injection. The drive current decreases when the injection command is off, and the fuel injection valve 3 performs a valve closing operation to stop the fuel injection.

The charging voltage (VCHG) decreases when the injection command is on, and rises after the injection command is off. In the present embodiment, the target voltage (HVCHG) and the standard voltage (Vstd) are set as determination voltages for determining a possibility of the learning and necessity of adjustment of the injection command. Even if the charging voltage does not reach the target voltage, it is considered that the injection can be appropriately performed by adjusting the injection command, and an appropriate learning result can be obtained. On the other hand, when the charging voltage is clearly insufficient, the injection may not be appropriately performed even if the injection command is adjusted, and it is considered that learning should not be performed. Therefore, in the injection control device 1, the target voltage and the standard voltage are set individually.

In the injection control device 1, V1 and V2 are set as timings of acquiring a charging voltage in order to determine the possibility of the learning and necessity of adjustment of the injection command. V1 is a timing when the charging voltage is acquired before the injection instruction is issued, and is set as a predetermined timing in a state where the injection command is off. V1 can be appropriately changed according to, for example, a state of the vehicle such as each cylinder, each injection, or the rotational speed. V2 is set as a predetermined timing after TQ=ON as a timing when the charging voltage at the time of issuing an injection instruction is acquired. Hereinafter, a charging voltage acquired at the timing of V1 is referred to as VCHG_V1, and a charging voltage acquired at the timing of V2 is referred to as VCHG_V2.

Figure 5:
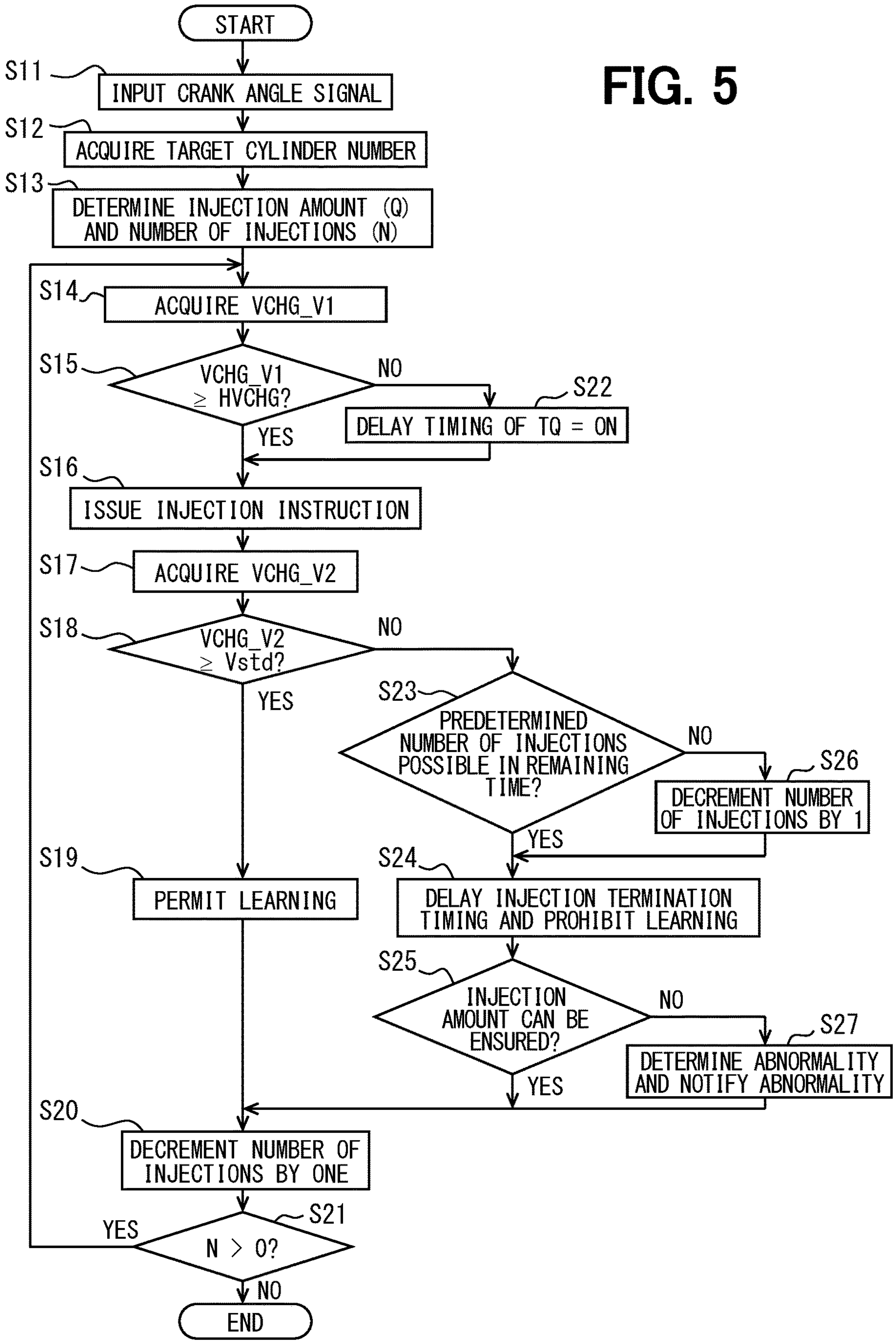
FIG. 5 is a flowchart showing a process performed by an injection control unit.

The microcomputer 2 executes a process shown in FIG. 5 as a specific injection control mode in the present embodiment. In the present embodiment, the microcomputer 2 executes the process shown in FIG. 5 as a so-called crank angle synchronization process in which a crank is synchronized with a crank angle signal output when the crank rotates at a predetermined crank angle, such as 30° CA. Therefore, in step S11, when the crank angle signal is input, the microcomputer 2 starts a substantial process. The crank signal is input to the microcomputer 2 as an interrupt signal, for example.

When the process is started, the microcomputer 2 acquires the number of a target cylinder in step S12, and determines the injection amount (Q) and the number of injections (N) for each cylinder in step S13. Hereinafter, the number of injections determined in step S13 is referred to as a predetermined number.

Figure 6:
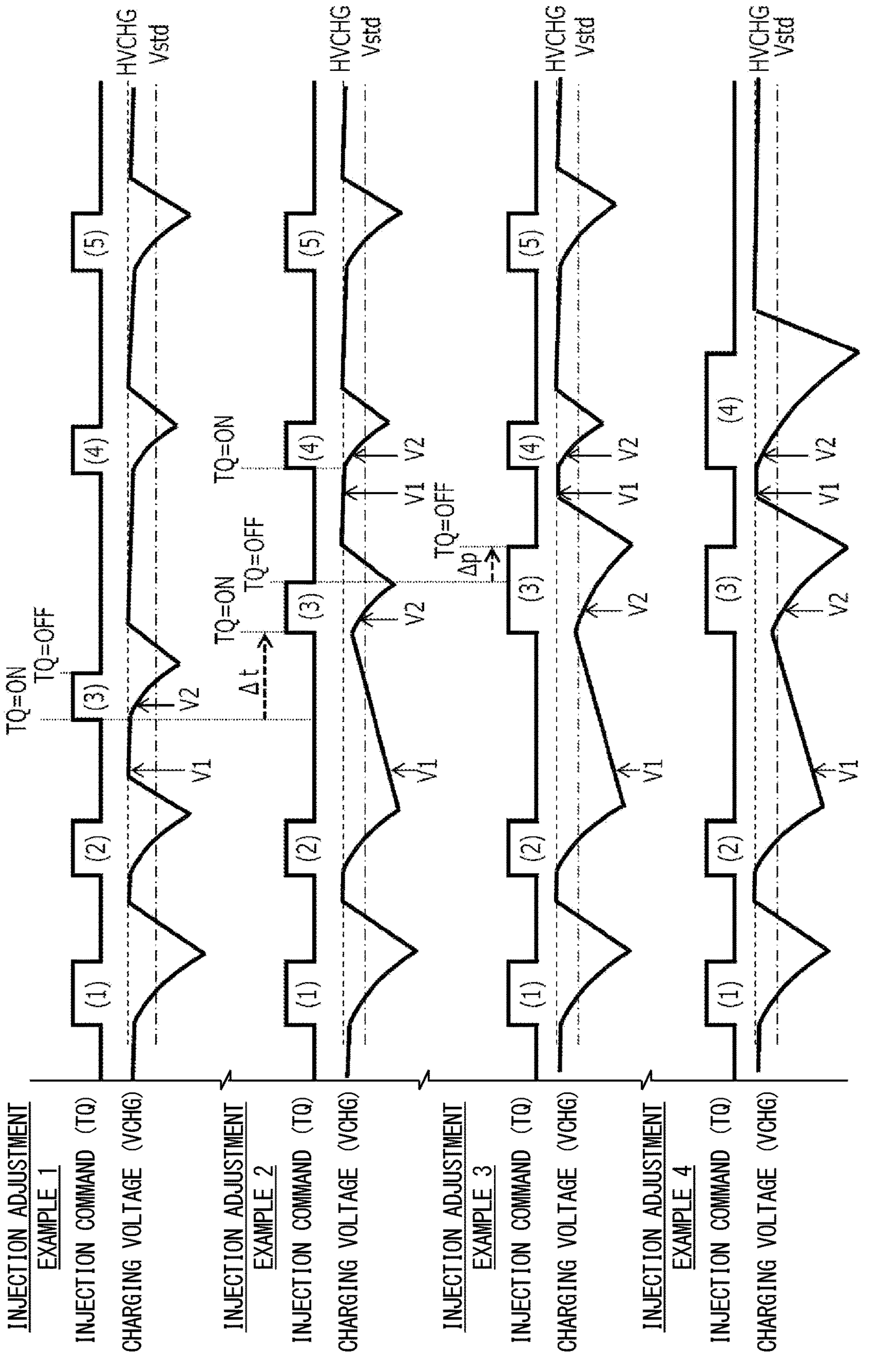
FIG. 6 is a diagram showing adjustment examples of the injection command and a relation between the injection command and the charging voltage.

Subsequently, the microcomputer 2 acquires VCHG_V1 in step S14, and determines whether VCHG_V1≥HVCHG in step S15. In step S15, for example, the microcomputer 2 determines whether the charging voltage (VCHG) at V1 in a third injection reaches the target voltage (HVCHG), as shown in an injection adjustment example 1 in FIG. 6. In the case of the injection adjustment example 1, VCHG_V1≥HVCHG in the third injection, and the charging voltage is sufficiently boosted to enable normal injection. In FIG. 6, the numbers in parentheses attached to the injection commands indicate the number of injections for each cylinder.

When determining that HG_V1≥HVCHG, the microcomputer 2 determines YES in step S15, so that the injection command (TQ) is on and the injection instruction is issued in step S16. An actual injection instruction is issued at a predetermined timing set after V1.

When the injection instruction is issued, the microcomputer 2 acquires the charging voltage (VCHG_V2) at V2 in step S17, and determines whether VCHG_V2≥Vstd in step S18. As shown in FIG. 4, the charging voltage decreases when the injection command is on. At this time, when the charging voltage is lower than the standard voltage (Vstd), there may be a failure that the injection of a predetermined injection amount cannot be performed.

Therefore, the microcomputer 2 determines whether VCHG_V2≥Vstd. In the case of the injection adjustment example 1, in the third injection, VCHG_V2≥Vstd, and the charging voltage is sufficient. When a sudden circuit failure or the like does not occur, in the case of VCHG_V1≥HVCHG, it is considered that VCHG_V2 acquired after TQ=ON basically satisfies VCHG_V2≥Vstd.

In this case, it is considered that the charging voltage is boosted to a state where the injection can be appropriately performed. Therefore, the microcomputer 2 permits learning in step S19. That is, the microcomputer 2 determines that a current injection is normally performed, and permits learning such that a learning result can be used for subsequent injections. That is, when VCHG_V1≥HVCHG and VCHG_V2≥Vstd, the microcomputer 2 determines that learning is necessary and permits learning.

Subsequently, the microcomputer 2 decrements the number of injections by one in step S20, and determines whether N>0 in step S21. For example, when the current injection is the third injection, since the remaining number of injections is two and N>0, the microcomputer 2 determines YES in step S21, and shifts the process to step S14 to repeat the same process for a next injection. On the other hand, when N=0 by repeating the injection, the microcomputer 2 determines NO in step S20 and ends the process. Thus, when VCHG_V1≥HVCHG and VCHG_V2≥Vstd, a normal injection is performed.

Here, as shown in an injection adjustment example 2 in FIG. 6, for example, a situation in which VCHG_V1 does not reach HVCHG in the third injection is also assumed. In this case, since VCHG_V1≥HVCHG is not satisfied, the microcomputer 2 determines NO in step S15 and delays a timing of TQ=ON by, for example, Δt in step S22. Δt can be set to a fixed value, and can be changed according to various parameters.

Subsequently, the microcomputer 2 shifts the process to step S17 to acquire VCHG_V2 and determine whether VCHG_V2≥Vstd in step S18. In the case of the injection adjustment example 2, since VCHG_V2≥Vstd, the microcomputer 2 permits the learning in step S19 and executes processes in steps S20 and S21 as described above. That is, even when VCHG_V1≥HVCHG is not satisfied, the microcomputer 2 permits learning when the charging voltage at the time of issuing an injection instruction reaches the standard voltage.

In the injection adjustment example 2, for example, in a fourth (next) injection, VCHG_V1≥HVCHG and VCHG_V2≥Vstd. Therefore, the microcomputer 2 determines that learning is necessary for the fourth injection, and permits learning. That is, although the microcomputer 2 delays the timing of TQ=ON once in the third injection, the microcomputer 2 cancels the adjustment of the injection when the charging voltage is equal to or higher than the standard voltage in the subsequent injection.

As shown in an injection adjustment example 3 in FIG. 6, for example, it is assumed that VCHG_V1 does not reach HVCHG in the third injection, and VCHG_V2 does not reach Vstd when the timing of TQ=ON is delayed. In this case, when determining NO in step S18, in step S23, the microcomputer 2 determines whether the predetermined number of injections is possible in the remaining time given before the predetermined number of injections is completed.

When determining that the predetermined number of injections is possible, the microcomputer 2 determines YES in step S23. Therefore, the microcomputer 2 prohibits learning and delays an injection termination timing in step S24. In step S24, since VCHG_V1≥HVCHG and VCHG_V2≥Vstd are not satisfied, the microcomputer 2 determines that an injection state is not normal, and prohibits the learning. Accordingly, for example, the storage of the boosting capability related to the current injection is prohibited, and a learning value acquired in an abnormal state in the subsequent injections is reduced from being reflected.

In step S24, as shown in the injection adjustment example 3, a timing of TQ=OFF is delayed, and an injection time from TQ=ON to TQ=OFF is extended by Δp. Δp is set to a time when the obtained injection amount can be secured. That is, by extending the injection time, the microcomputer 2 can ensure the injection amount required for the current injection even when the charging voltage is insufficient.

Subsequently, in step S25, the microcomputer 2 determines whether the injection amount can be secured by extending the injection time. In this case, the microcomputer 2 may be configured to determine, multiple times, whether the injection amount can be secured until the injection termination timing is reached. When it is determined that the injection amount can be secured, the microcomputer 2 shifts the process to step S20 as it is since YES is determined in step S25.

In the injection adjustment example 3, for example, in a fourth injection, VCHG_V1≥HVCHG and VCHG_V2≥Vstd. Therefore, the microcomputer 2 cancels the prohibition of learning and cancels the adjustment of the injection. On the other hand, when determining that the injection amount cannot be secured, the microcomputer 2 determines NO in step S25. Therefore, the microcomputer 2 determines that an abnormality occurs in step S27, notifies other control devices of the determination, and then shifts the process to step S20. Accordingly, it is possible to operate a fail-safe function such as limiting the output of the internal combustion engine.

As shown in an injection adjustment example 4 in FIG. 6, for example, it is assumed that VCHG_V1 does not reach HVCHG in the third injection, and VCHG_V2 does not reach Vstd when the timing of TQ=ON is delayed. In this case, when determining NO in step S18, in step S23, the microcomputer 2 determines whether the predetermined number of injections is possible in the remaining time.

When determining that the predetermined number of injections is not possible, the microcomputer 2 determines NO in step S23. Therefore, in step S26, the microcomputer 2 decrements the number of injections by one and distributes the remaining injection amount. That is, the microcomputer 2 limits the number of injections for each cylinder to be smaller than the predetermined number of injections, and distributes the injection amount to be injected for each cylinder to the subsequent injections. Accordingly, even when the number of injections is limited, a total injection amount required in the subsequent injections can be injected.

Subsequently, the microcomputer 2 shifts the process to step S24 to prohibit learning and delay the injection termination timing, and then shifts the process to step S20 to decrement the number of injections by one when the injection amount can be secured in step S25. Accordingly, for example, when the current injection is the third injection, the number of injections is decremented by one in step S26, and the number of injections is decremented by one in step S20, so that N=3−1−1=1. The microcomputer 2 shifts the process to step S14 and similarly executes a process based on the charging voltage for the next injection.

As described above, in the injection control device 1, when the charging voltage at the time of driving the fuel injection valve 3 does not reach the predetermined determination voltage, a process of prohibiting learning or adjusting injection is executed.

According to the injection control device 1 described above, the following effects can be obtained.

The injection control device 1 includes the microcomputer 2 as an injection control unit that controls the fuel injection valve 3, which is current-driven by a charging voltage obtained by boosting the battery voltage (VB), to perform fuel injection multiple times for each cylinder. When the charging voltage does not reach a predetermined determination voltage, the microcomputer 2 prohibits learning or adjusts the injection.

in order to exert the effect of reducing harmful components contained in exhaust gas at a maximum limit, it is necessary to learn the state of the fuel injection valve 3 or charge the fuel injection valve 3 to a high voltage required for the injection. However, when the fuel injection valve 3 is not charged to the required high voltage, appropriate learning cannot be performed, and when such a learning result is reflected in the subsequent injections, the fuel injection cannot be appropriately performed. When the fuel injection valve is not charged to the required high voltage, a required injection amount cannot be secured, and controllability may be deteriorated.

When the charging voltage does not reach the predetermined determination voltage, the injection control device 1 can perform appropriate learning and reduce deterioration of controllability by prohibiting the learning or adjusting the injection.

The injection control unit sets a standard voltage and a target voltage as the determination voltage, and prohibits learning or adjusts the injection when the charging voltage at the time of issuing an injection instruction is lower than the standard voltage or when the charging voltage at a predetermined voltage detection timing does not reach the target voltage.

When the charging voltage is sufficiently boosted, the learning can be appropriately performed. In a case where the injection can be appropriately performed by adjusting the injection even when the charging voltage is slightly low, appropriate learning can also be performed by including the injection as a learning target. Therefore, an appropriate learning result can be obtained, and a learning frequency can be prevented from being excessively reduced. Since the learning should not be performed when the charging voltage is clearly insufficient, the learning is prohibited in such a situation, so that it is possible to reduce a failure such as a correction of the subsequent injections based on an inappropriate learning result. That is, the appropriate learning can be performed by individually setting the target voltage and the standard voltage.

The injection control unit sets the standard voltage and the target voltage as the determination voltage, prohibits learning when the charging voltage at the time of issuing an injection instruction is lower than the standard voltage or when the charging voltage at a predetermined voltage detection timing does not reach the target voltage, and permits learning when the charging voltage is equal to or higher than the standard voltage. Accordingly, as described above, appropriate learning can be performed by individually setting the target voltage and the standard voltage, and when learning is once prohibited, learning can also be performed when the charging voltage is sufficient such that an appropriate learning result can be obtained at the time of the subsequent injections, and the learning frequency can be prevented from being excessively reduced.

The injection control unit sets the standard voltage and the target voltage as the determination voltage, adjusts the injection when the charging voltage at the time of issuing an injection instruction is lower than the standard voltage or when the charging voltage at a predetermined voltage detection timing does not reach the target voltage, and cancels the adjustment of the injection when the charging voltage is equal to or higher than the standard voltage. Accordingly, as described above, it is possible to adjust the timing of TQ=ON when the target voltage is not reached, or to adjust the number of injections or the injection time when the standard voltage is not reached, so that it is possible to adjust the injection in more detail. When the injection is once adjusted, unnecessary adjustments can be reduced in the subsequent injections.

The injection control unit adjusts the injection by securing a predetermined injection amount by extending an injection time. Accordingly, when the charging voltage is insufficient, a predetermined injection amount of fuel can be injected, and deterioration of controllability can be reduced.

The injection control unit adjusts the injection by setting the number of injections smaller than a predetermined number of injections. At this time, by distributing an injection amount required for the subsequent injections as described above, the predetermined injection amount of fuel can be injected, and deterioration of controllability can be reduced.

The injection control unit adjusts the injection by delaying a timing of issuing an injection instruction. Accordingly, delaying the timing of issuing an injection instruction means that the time for boosting the charging voltage becomes longer. Accordingly, since the charging voltage rises at the timing of issuing an injection instruction, it can be expected that the injection can be appropriately performed. When the injection can be appropriately performed, deterioration of controllability can be reduced.

When the injection is to be adjusted, it is possible to perform an appropriate adjustment in accordance with a state of the charging voltage by combining a process of extending the injection time to ensure the predetermined injection amount, and a process of delaying the timing of issuing an injection instruction, as in the embodiment.

The control unit and the method described in the present disclosure may be implemented by a dedicated computer provided by forming a processor and a memory programmed to execute one or more functions embodied by a computer program. Alternatively, the control unit and the method described in the present disclosure may be implemented by a dedicated computer provided by forming a processor with one or more dedicated hardware logic circuits. Alternatively, the control unit and the method described in the present disclosure may be implemented by one or more dedicated computers formed by a combination of a processor and a memory programmed to execute one or more functions and a processor formed by one or more hardware logic circuits. The computer program may also be stored on a computer readable and non-transitory tangible recording medium as instructions executed by a computer.

What is claimed is:

1. An injection control device comprising:

an injection controller configured to control a fuel injection valve, which is current-driven by a charging voltage obtained by boosting a battery voltage by charging a capacitor, to perform fuel injection a plurality of times for each cylinder, wherein the injection controller is configured to detect a boosting time required for the charging voltage to reach a target voltage, calculate a boosting capability, which indicates an amount of energy stored in the capacitor per unit time, using the boosting time, learn the boosting capability by storing the boosting capability, and prohibit learning of the boosting capability when the charging voltage does not reach a predetermined determination voltage.

2. The injection control device according to claim 1, wherein the injection controller is configured to set a standard voltage and the target voltage as the determination voltage and prohibit the learning when the charging voltage at the time of issuing an injection instruction is lower than the standard voltage or when the charging voltage at a predetermined voltage detection timing does not reach the target voltage.

3. The injection control device according to claim 1, wherein the injection controller is configured to set a standard voltage and the target voltage as the determination voltage, prohibit the learning when the charging voltage at the time of issuing an injection instruction is lower than the standard voltage or when the charging voltage at a predetermined voltage detection timing does not reach the target voltage, and permit the learning when the charging voltage becomes equal to or higher than the standard voltage.

4. The injection control device according to claim 1, further comprising:

a determiner configured to determine whether the charging voltage does not reach the predetermined determination voltage, wherein the injection controller is configured to prohibit the learning in response to a determination of the determiner that the charging voltage does not reach the predetermined determination voltage.

5. The injection control device according to claim 1, wherein the injection controller is configured to compare the boosting capability with a predetermined reference boosting capability, when the boosting capability is higher than the reference boosting capability, calculate an injection correction time such that an injection set time becomes shorter so that an injection amount is the same as the injection amount corresponding to the reference boosting capability, when the boosting capability is lower than the reference boosting capability, calculate the injection correction time such that the injection set time becomes longer so that the injection amount is the same as the injection amount corresponding to the reference boosting capability, correct a fuel injection time with the injection correction time to generate an injection command, and output the injection command to the fuel injection valve.

6. The injection control device according to claim 5, wherein the injection controller is configured not to calculate the boosting capability in a period in which at least one of a condition where the capacitor is discharged or a condition where the charging voltage exceeds the battery voltage is established.

7. The injection control device according to claim 5, wherein the injection set time corresponds to a time period in which the fuel injection is performed.

8. An injection control device comprising:

a processor configured to control a fuel injection valve, which is current-driven by a charging voltage obtained by boosting a battery voltage by charging a capacitor, to perform fuel injection a plurality of times for each cylinder, detect a boosting time required for the charging voltage to reach a target voltage, calculate a boosting capability, which indicates an amount of energy stored in the capacitor per unit time, using the boosting time, learn the boosting capability by storing the boosting capability, and prohibit learning of the boosting capability when the charging voltage does not reach a predetermined determination voltage.

* * * * *